Jan. 12, 1943.  W. O. MICHELSEN  2,307,942
TYPEWRITING MACHINE
Filed Sept. 18, 1941  5 Sheets-Sheet 1
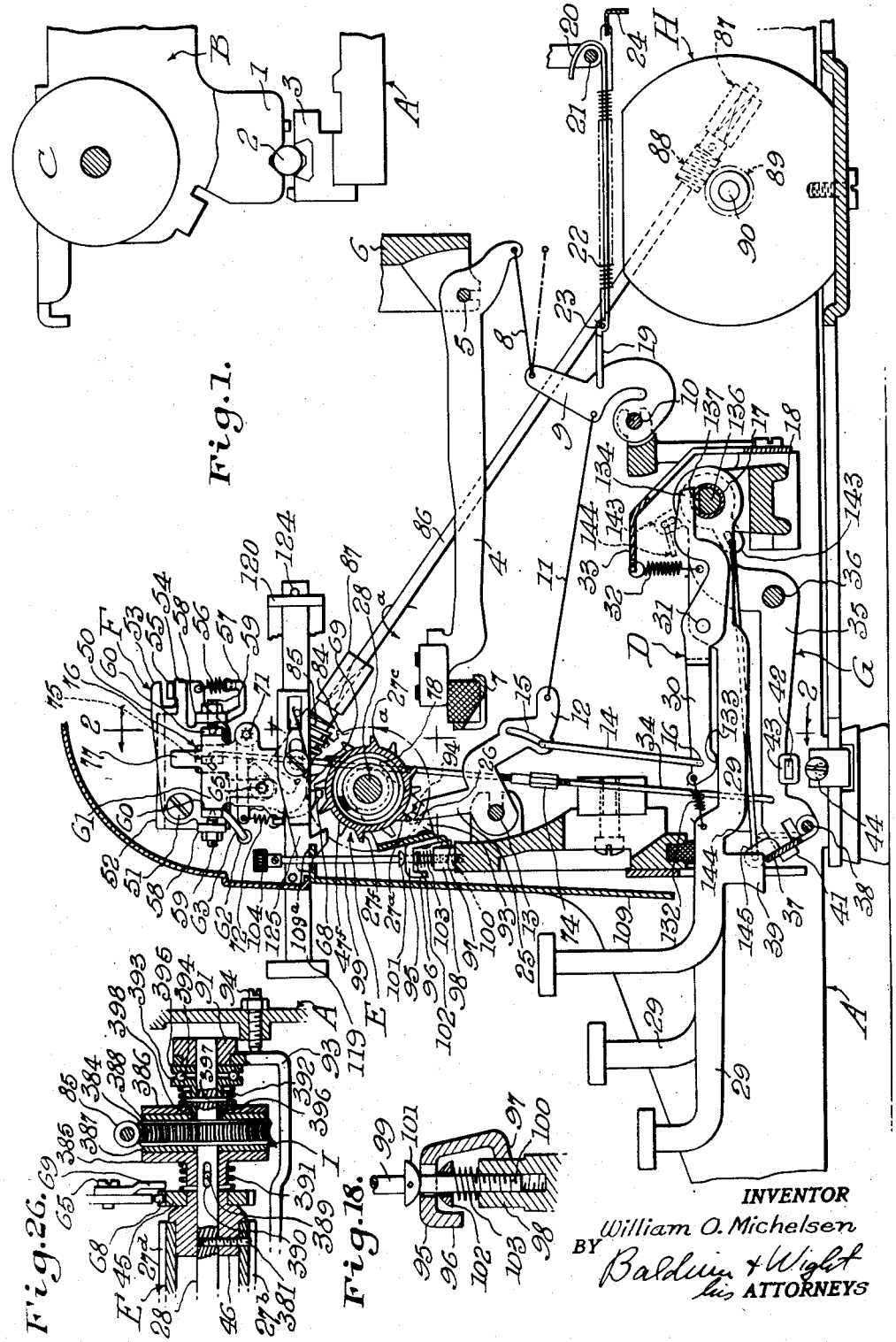
INVENTOR
William O. Michelsen
BY Baldwin & Wight
his ATTORNEYS

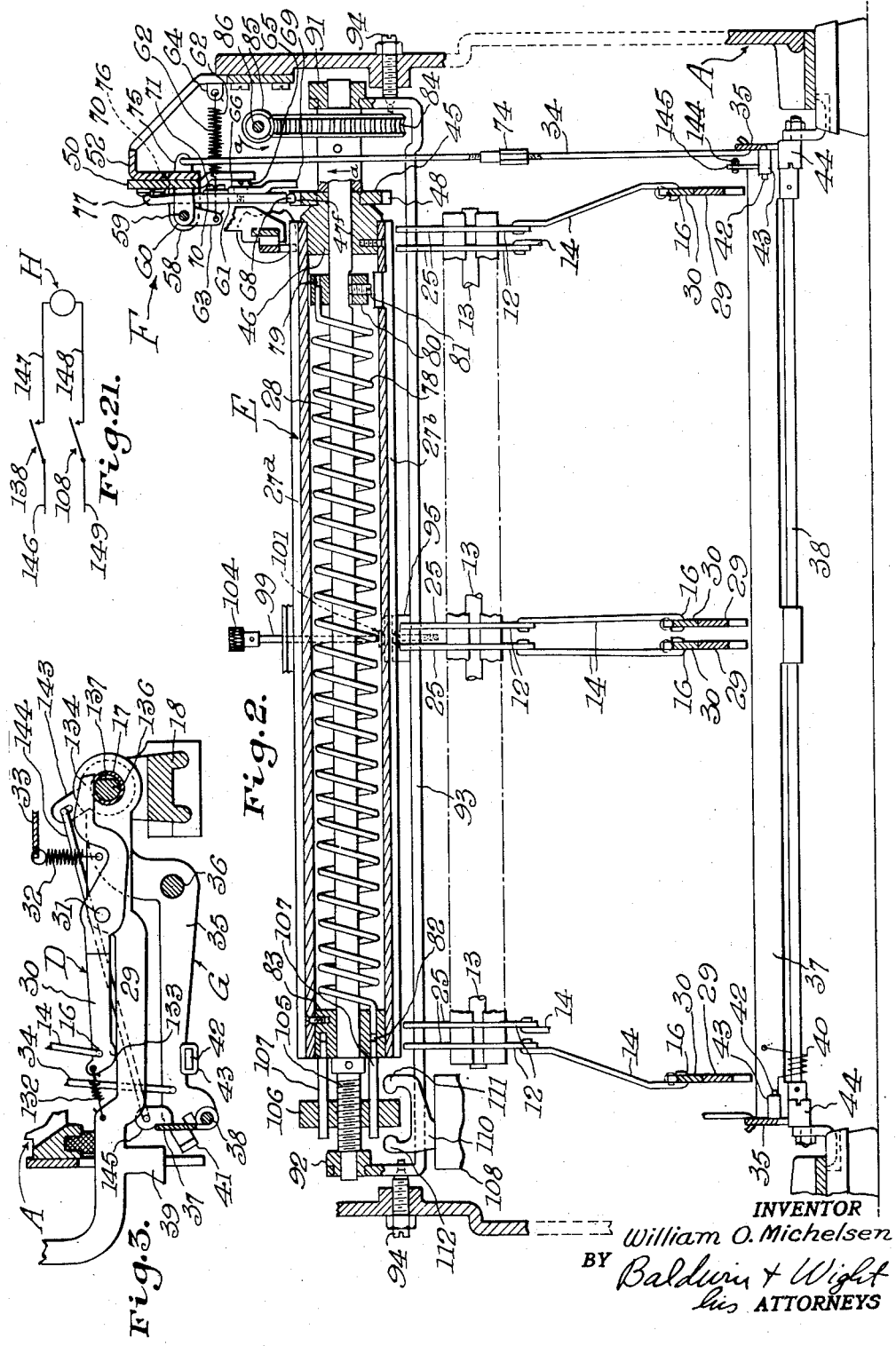

Jan. 12, 1943.　　W. O. MICHELSEN　　2,307,942
TYPEWRITING MACHINE
Filed Sept. 18, 1941　　5 Sheets-Sheet 3
Fig. 4.
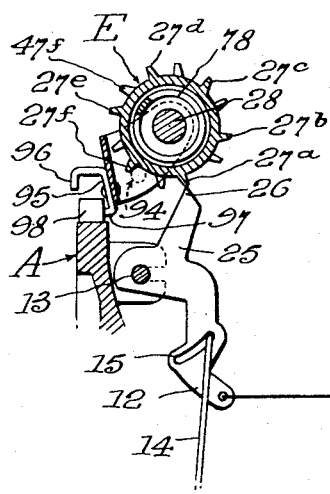
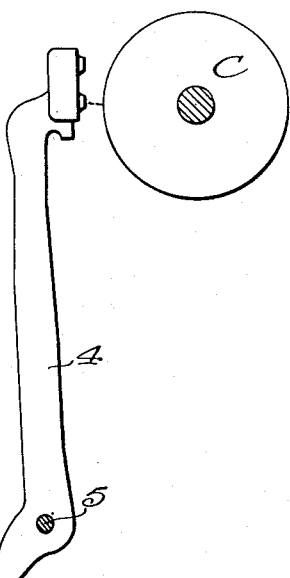
Fig. 5.
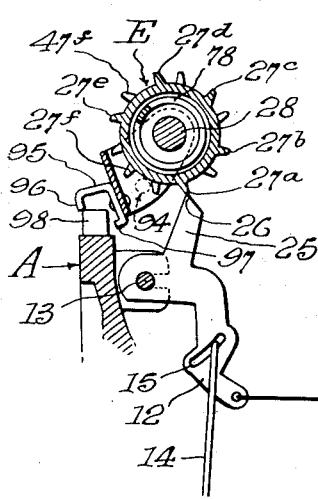
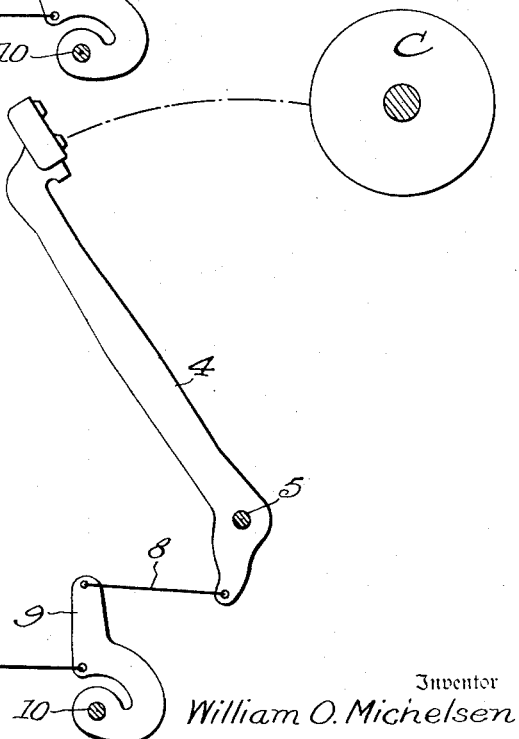
Inventor
William O. Michelsen
By Baldwin & Wight
his Attorneys Jan. 12, 1943.  W. O. MICHELSEN  2,307,942
TYPEWRITING MACHINE
Filed Sept. 18, 1941   5 Sheets-Sheet 4

Inventor
William O. Michelsen
Baldwin & Wight
His Attorneys

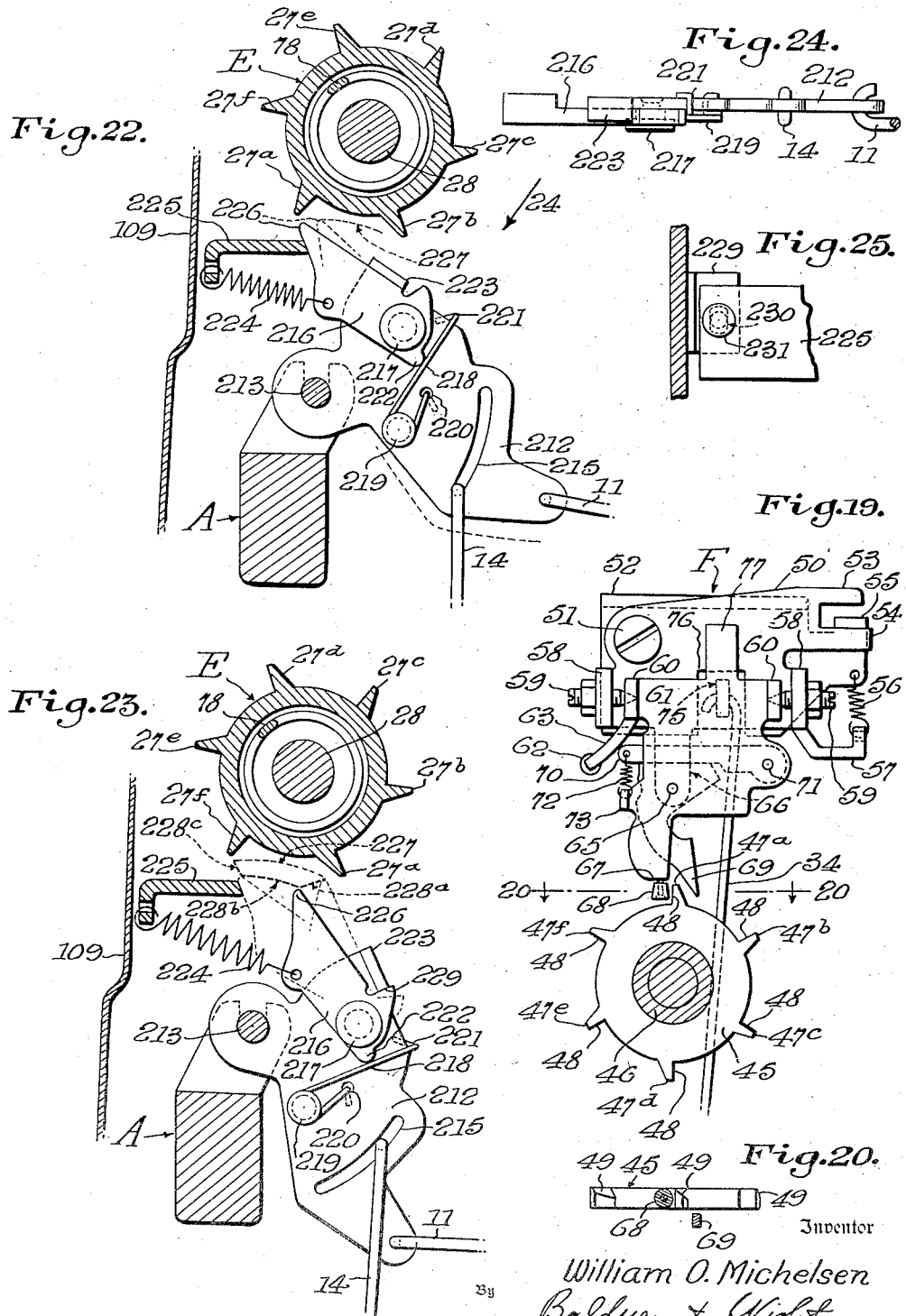

Patented Jan. 12, 1943

2,307,942

UNITED STATES PATENT OFFICE 2,307,942

TYPEWRITING MACHINE

William Otto Michelsen, Woodhaven, N. Y., assignor to Royal Typewriter Company, Inc., New York, N. Y., a corporation of New York Application September 18, 1941, Serial No. 411,417

50 Claims. (Cl. 197—17)

This invention relates to typewriting machines, and more particularly to power-operated mechanism for actuating the type bars of such machines.

One of the objects of the invention is to provide a typewriter having power-operated type bar mechanism which is simple, compact, and capable of operating efficiently and rapidly. In accordance with the invention, a rotatable toothed drum is mounted adjacent the front and top of a typewriter which, except for the power-operated mechanism, is generally similar in construction to commercial standard typewriters, such as the Royal Standard typewriter. The rotatable drum is positioned in front of the usual type bar head rest and thus occupies space usually present but not used in present-day standard typewriters. Actuators associated respectively with the individual type bars are positioned under the drum and these also are in front of the type bar head rest. The actuators are adapted to be brought into engagement with teeth on the drum in response to depression of key levers, which, through escapement mechanism, also control the intermittent or step-by-step rotation of the drum.

Another object of the invention is to provide an improved mounting or arrangement of the drum and the actuators which enables adjustment to vary the type bar impact.

Another object is to provide an improved construction of spring motor and drum and improved escapement mechanism for controlling step-by-step rotation of the drum.

Another object is to provide improved mechanism for controlling the operation of an electric motor for rewinding a spring which energizes or urges the drum to rotate against the restraint of the escapement mechanism.

Another object is to provide a conveniently operable device for backing or reversely rotating the toothed drum to relieve a jamming of parts which might occur as a result of improper use of the machine, for example, the striking of two key levers simultaneously.

A further object is to provide means preferably including a single element which when operated manually will make all adjustments or settings of the parts which are necessary or desirable for conditioning the machine selectively for power type bar operation or manual type bar operation.

Other objects will become apparent from a reading of the following description, the appended claims, and the accompanying drawings, in which:

Figure 1 is a fragmentary, transverse, vertical, sectional view of a typewriter embodying the invention;

Figure 2 is a section taken on the line 2—2 of Figure 1, with some parts omitted;

Figure 3 is a fragmentary view, partly in section and partly in elevation, showing operating mechanism adjusted or set to enable manual actuation of type bar mechanism;

Figure 4 is a somewhat diagrammatic view showing a type bar and associated power-operated parts in the positions they occupy at the moment the power impulse for driving the type bar is ended when the parts have been set or adjusted to effect a relatively heavy type bar impact;

Figure 5 is a view similar to Figure 4 but showing the positions the parts occupy at the end of the power impulse when the parts have been adjusted to effect a relatively light type bar impact;

Figure 7:
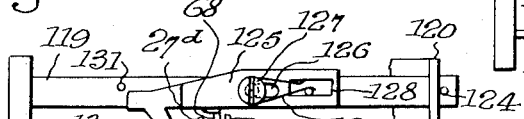
Figure 7 is a fragmentary view, partly in section and partly in elevation, of the parts shown in Figure 6 and a rotatable drum associated therewith.
Figure 14:
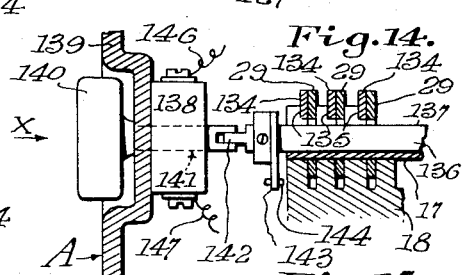
Figure 15:
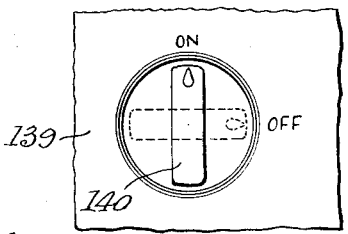
Figure 16:
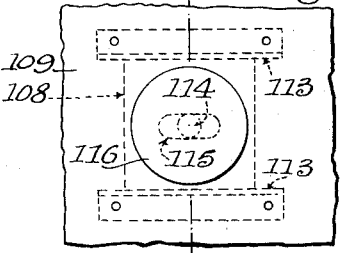
Figure 17:
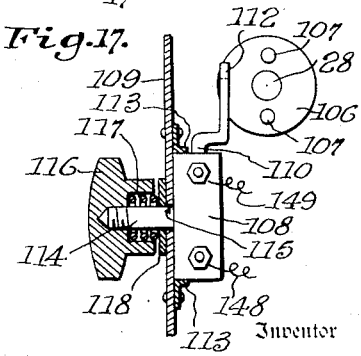

Figures 8 to 13, inclusive, are views similar to Figure 7 but showing the positions occupied by the parts at several different stages of operation;

Figure 14 is a fragmentary, detailed, vertical, sectional view of a key lever mounting sleeve and control switch;

Figure 15 is a fragmentary view in elevation looking in the direction of the arrow x in Figure 14;

Figure 16 is a fragmentary elevational view of a spring motor tension adjusting switch mounting;

Figure 17 is a fragmentary section taken on the line 17—17 of Figure 16;

Figure 18 is a detailed view, partly in section and partly in elevation, of a power roller adjusting device;

Figure 19 is a view, partly in section and partly in elevation, showing power drum controlling escapement mechanism;

Figure 20 is a section on the line 20—20 of Figure 19;

Figure 21 is a wiring diagram;

Figure 22 is a detail view, partly in section and partly in elevation, showing a modified power-transmitting mechanism in its state-of-rest position;

Figure 23 is a view similar to Figure 22 but showing the parts in positions occupied following the operation of the type bar;

Figure 24 is a plan view of an actuator and pawl as viewed when looking in the direction of the arrow 24 in Figure 22;

Figure 25 is a fragmentary view, partly in section and partly in elevation, and showing an adjustable mounting for a pawl-aligning plate; and Figure 26 is a vertical, sectional view of a modified power drum urging or driving mechanism.

The drawings show only such conventional parts of a front strike typewriter as will be of assistance in understanding the description of the power type bar operating mechanism embodying the invention. Among the known parts shown is a main frame A on which a carriage B is mounted for letter-spacing and return travel, the carriage being equipped with a rail 1 supported by ball bearings 2 on a bottom rail 3 carried by the frame A. A cylindrical platen C is supported upon the carriage. The carriage may be driven for letter-spacing by any conventional or suitable mechanism, for example, by a spring motor and draw band of a well known kind operating against the restraint of an escapement mechanism. The carriage may be returned manually, or, if desired, power mechanism may be provided for returning the carriage. The typewriter includes a set of type bars one (4) of which is shown pivoted at 5 on a type bar segment 6 intermediate the front and rear of the frame A and which serves also as a pivotal support for the other type bars (not shown). Normally, the type bars are at rest with their heads supported upon a head rest 7 located adjacent the front wall of the frame but spaced a little rearwardly therefrom.

The type action, i. e., mechanism for driving the type bars, is substantially like the well known action or mechanism provided in Royal Standard typewriters. As shown, a link 8 pivoted at its rear end to the type bar 4 is connected at its front end to an intermediate lever 9 which is pivoted on the frame A as at 10. A link 11, pivoted at its rear end to the lever 9, extends forwardly and has its front end pivoted to a front lever or actuator 12 which is pivotally mounted on and adjacent the front of the frame A as at 13. The upper end of a wire link 14 has combined pivotal and lost motion sliding movement in a slot 15 formed in the front lever 12, and at its bottom is pivoted at 16 to a key lever assembly generally designated D which is pivoted to rock in a sleeve 17 carried by a cross bar 18 supported behind the actuators 12 on the frame A. The parts comprising the key lever assembly D will be described later. For the present, it may be considered that when an assembly D is moved downwardly the link 14 will be pulled so as to effect operation of the type bar 4 in a manner to be described. A link 19 has its forward end connected to the intermediate lever 9, and at its rear end is formed with a hook 20 embracing a universal bar 21 adapted to operate carriage escapement mechanism, not shown. A returning spring 22 connected as at 23 to the front end portion of the link 19 has its rear end anchored on a bracket 24 supported on the main frame. The type action parts just described are those for operating a single type bar 4, and it may be understood that for each other type bar a similar type action or set of parts is provided.

The front lever 12 differs from the front levers with which Royal Standard typewriters heretofore have been provided in that it is provided with an upstanding arm 25 formed with a point 26 adapted to be driven by circumferentially spaced teeth $27^a$, $27^b$, $27^c$, $27^d$, $27^e$, and $27^f$ extending longitudinally on an intermittently operable drum E journaled on the frame A in a manner later to be described. Means later to be described are provided for constantly urging the drum in a counter clockwise direction under the restraint, however, of escapement mechanism generally designated F. The drum may be mounted for adjustment to shift its axis and thus to vary the distance of the path of its teeth from the front lever point 26, but for the present the drum may be considered as being carried by a shaft 28 mounted in fixed position on the frame A.

The key lever assembly D includes a main lever 29 pivoted on the sleeve 17 and a supplemental lever 30 pivoted as at 31 on the main lever 29. As will be described later, the purpose of providing the supplemental lever 30 in addition to the main lever 29 is to absorb shocks and avoid a kickback of the main lever when the type bar returns from the printing position to its normal position of rest. In considering the general construction and operation of the parts, it will suffice to treat the supplemental lever 30 and main lever 29 as moving substantially together. A spring 32 interposed between the assembly D and a frame-mounted bracket 33 normally maintains the assembly D in the elevated position shown in Figure 1.

Considering the operation generally, when a key lever assembly D is depressed, the wire link 14 will be pulled downwardly, and, with its upper end at the bottom of the slot 15, will rock the front lever or actuator 12 clockwise as viewed in Figure 1 so as to pull forwardly on the link 11, rock the intermediate lever 9 counterclockwise, pull forwardly on the link 8, and rock the type bar 4 through a small angle about its pivot 5, thus starting it on its operating movement. The slight rocking movement of the actuator 12 will move its point 26 in front of and in the path of the drum tooth $27^a$. After the positioning of the point 26 in the path of the tooth $27^a$, the escapement mechanism F is operated to release the drum E and permit it to move through one-sixth of a complete rotation, whereupon the tooth $27^a$ will engage the point 26 of the conditioned actuator and rock the actuator quickly, thereby pulling forwardly on the link 11 and operating the intermediate lever 9 and link 8 to drive the type bar 4 to a position in which its type head is spaced a predetermined distance from the platen C, this distance depending upon an adjustment of the parts which will be described later. Figure 4 shows the position of the parts when the type bar head has reached this predetermined position according to an adjustment of the parts calculated to effect a relatively heavy type bar impact. As shown in Figure 4, the tooth $27^a$ has reached a position in which it no longer is driving the actuator 12, and is just about to move away from its contact with the point 26. The type head is still spaced from the platen C so that the remaining type head travel will be produced by the momentum of the type bar and associated driving parts.

Inasmuch as the lever point 26 should be moved into the path of a tooth of the drum 2 before the drum is released by the escapement mechanism F, it is desirable to effect the release by the escapement mechanism by means operated by the same key lever assembly that produces the initial movement of the actuator 12, such an arrangement assuring proper timing of the escapement release with relation to the initial moving of the front lever. In the form shown, a rod or link 34 is connected at its upper end to the escapement mechanism F and at its lower end is connected to a universal bar assembly G including side arms 35 rockable about the sleeve 17 on which the key lever assemblies D are pivoted. The universal bar assembly further includes a stiffening rod 36 extending between the side arms 35, and a front cross bar 37 pivoted on a front rod 38 extending between the side arms 35. When the mechanism is set for power actuation of the type bars the front cross bar 37 is in the position shown in full lines in Figure 1 in which it extends under a depending ear 39 on the main key lever 29. A spring 40 (see Figure 2) urges the front cross bar 37 up against stop ears 41 formed on the front ends of the side arms 35. All of the key levers have depending ears 39 which are positioned above the universal front cross bar 37 when the latter is in the position shown in Figure 1 so that upon depression of any key lever the associated ear 39 will push downwardly on the universal front cross bar 37 so as to rock the universal bar assembly G about the sleeve 17 and thereby pull down on the rod 34 to operate the escapement mechanism F. The downward movement of the universal bar assembly G and hence the downward movement of the key levers is limited so as to permit only a relatively slight downward movement of the key levers when the typewriter is adjusted or set for power operation of the type bars. For accomplishing this purpose the side arms 35 are provided with ears 42 equipped with cushions 43 of rubber or similar shock-absorbing material adapted to engage adjustable eccentric stops 44 mounted on frame A. Rotation of the stops 44 will vary the total possible downward movement of the key levers which can take place during power operation of the machine.

A preferred form of escapement mechanism is shown in Figures 1 and 2 and on an enlarged scale in Figures 19 and 20. It includes an escapement wheel 45 fixed to a bearing collar 46 journaled on the shaft 28 and mounting the right hand end (as viewed in Figure 2) of the drum E. The escapement wheel 45 is formed with six teeth 47ª, 47ᵇ, 47ᶜ, 47ᵈ, 47ᵉ, 47ᶠ having their front faces 48 lying in radial planes and their rear faces cammed or inclined at 49 as shown in Figure 20. An escapement frame 50 is pivotally mounted as at 51 on a bracket 52 supported on the main frame A. The frame 50 is forked to provide arms 53 and 54 which extend respectively above and below a stop lug 55 forming part of the bracket 52. A spring 56, interposed between the bracket 52 and an arm 57 on the escapement frame 50, urges the parts to the positions shown in Figures 1 and 19 in which the arm 54 is pressed up against the bracket ear 55.

Ears 58 formed on the escapement frame 50 mount pivot screws 59 which engage the ears 60 of an escapement rocker plate 61 and thereby mount the rocker plate for oscillatory or rocking movement. A spring 62, interposed between an arm 63 on the rocker plate and an ear 64 on the bracket 52, draws or urges the escapement rocker plate to one limit position as shown in Figure 2 wherein a pivot screw 65 on the rocker plate 61 abuts against a depending lug 66 forming part of the escapement frame 50. A relatively fixed dog 67, formed as part of the escapement rocker plate, includes a roller 68 adapted normally to be positioned in front of one of the drum teeth as shown in Figures 1, 2, 19 and 20 so as to hold the drum E against rotation. In the drawings the escapement tooth designated 47ª is shown in contact with and being restrained by the dog roller 68. The pivot screw 65 mounts a movable dog 69 normally positioned to the rear of the drum tooth 47ª which is being held by the relatively fixed dog 68. The dog 69 is held in such position by means of a lever 70 pivoted at 71 on the rocker plate 61 and being caused to press against the heel of the dog 69 by a spring 72 interposed between the free end of the lever 70 and an ear 73 on the rocker plate 61.

In operation, the escapement plate 61 is rocked clockwise (as viewed in Figure 2) about the pivots 59 to move the dog roller 68 from in front of the escapement wheel tooth 47ª and to shift the movable dog 69 into the path of the escapement wheel tooth 47ᵇ, whereupon the drum is moved by its urging means until the tooth 47ᵇ is stopped by the dog 69. When the escapement rocker plate is returned to its normal position, the dog roller 68 will move in front of and engage the wheel tooth 47ᵇ which has just previously been arrested by the dog 69, and the dog 69 will be moved out of the path of the escapement teeth.

For rocking the escapement plate 61 the rod or link 34, the length of which is adjustable by a turnbuckle 74, is connected at its upper end to an ear 75 on the plate 61, the arrangement being such that, when a key lever assembly D is depressed and the universal bar assembly G is rocked downwardly, the link 34 will pull on the ear 75 so as to rock the escapement plate 61 about the pivot screws 59. The escapement plate ear 75 extends with clearance through a slot or opening 76 formed in the escapement frame 50 and frame bracket 52. A stop ear 77 extending from the top of the rocker plate 61 is engageable with the escapement frame 50 for limiting rocking of the escapement plate 61 when a key lever assembly is depressed. The timing of the escapement release may be controlled and adjusted by means of the turnbuckle 74 interposed in the connecting rod 34.

It will be understood that when the escapement wheel has been released by rocking of the plate 61 the drum E and escapement wheel will rotate quickly through one-sixth of a complete revolution, and will then be brought to rest by engagement of the next succeeding escapement tooth with the movable dog 69. Too sudden stopping of the drum with consequent shocks is avoided by movement of the escapement frame 50 about the pivot 51 yieldingly resisted by the spring 56. In this way a large amount of noise and destructive shocks are avoided.

In the embodiment shown in Figures 1 and 2, the drum E is powered by a spring motor which always is wound up or maintained properly tensioned by an electric motor H which operates only intermittently when the spring motor has run down to a predetermined extent, and requires rewinding. The illustrative embodiment includes a long coiled spring 78 wound around the shaft 28 and having one of its ends anchored in an aperture 79 in a collar 80 made fast to the shaft 28 by means of a set screw 81 adjacent the bearing collar 46. The other end of the motor spring is anchored in an aperture 82 formed in a bearing collar 83 which journals the opposite end of the drum E on the shaft 28. Normally, the shaft 28, the collar 80, and the end of the spring 78 anchored therein are stationary, the tension of the spring tending to rotate the drum E counterclockwise as viewed in Figure 1. Rotation of the drum is controlled by the escapement mechanism F, as previously described.

After a number of operations of the escapement mechanism, and consequent movements of the drum E, the tension of the spring 78 will be reduced, requiring that the spring be rewound so as to be conditioned for further operation. For rewinding the spring, a worm wheel 84 fast with the shaft 28 meshes with a worm 85 fast on the upper end of an inclined shaft 86 journaled in bearings 87 supported on the main frame A. A helical gear 88 fast on the lower end of the shaft 86 meshes with a helical gear 89 fast with the motor shaft 90 at the rear of the frame A. When the spring 78 requires re-tensioning, the motor H is operated to drive the shafts 86 and 28 in the directions indicated by the arrows $a$ in Figures 1 and 2, thereby rotating the collar 80 while the bearing collar 83 is held stationary by engagement of the escapement wheel with the fixed escapement dog roller 68. The starting and stopping of the electric motor H are controlled automatically by means hereinafter described.

It is desirable to provide for adjusting or varying the force with which the type bars impinge upon the work sheet. In accordance with the invention, one way of accomplishing this purpose is by adjusting or varying the distance between the axis of rotation of the drum E and the pivots of the front levers or actuators 12 so as to vary the arcs of contact of the drum teeth with the points 26 on the front levers. In the form shown, the shaft 28 which carries the drum E is journaled in bearings 91 and 92 carried by a bail 93 which is pivoted to rock on screws 94 supported on the main frame A, the arrangement being such that rocking of the bail will shift the axis of rotation of the drum E so as to cause an active or driving drum tooth to move out of contact with the point 26 of a driven front link 12 sooner or later during the movement of the type bar 4. For limiting the adjusting or rocking movement of the bail, it is equipped with a bracket 95 formed with stops 96 and 97 engageable, respectively, with a stop 98 fixed to the frame A. Rocking of the bail within the limits determined by the stops 96, 97, and 98 is accomplished conveniently by rotation of a stem 99 the lower end of which has threaded connection at 100 with the stop 98. The upper end portion of the stem 99 is journaled and supported by a flange 109$^a$ on the front wall 109 of the frame A. Downward movement of the stem 99 causes a collar 101 fixed thereon to press downwardly upon the bracket 95 and rock the bail counterclockwise, as viewed in Figure 1. Upward movement of the stem retracts the collar 101 and permits a collar 102 loose on the stem to be moved upwardly by a spring 103 to rock the bail 93 clockwise. Rotation of the stem is facilitated by a knurled thumb knob 104.

Figures 4 and 5 show, respectively, the positions of adjustment of the bail 93 and drum E for effecting a maximum type bar impact (Figure 4), and a minimum type bar impact (Figure 5). In Figure 4 the bail stop 97 is shown in engagement with the frame stop 98, the axis of the drum E thus being positioned as close as possible to the pivot 13 of the front lever 12. A drum tooth 27$^a$ is shown just about to leave contact with the point 26 of the front lever, and the head of the type bar 4 is still spaced about one-eighth inch from the platen C. With the parts in the positions shown, the driving of the type action by the drum E has ceased, and the type bar 4 will have to continue its movement to the printing point by its own momentum. Inasmuch as the driving impulse provided by the drum E continues until the type head is almost at the printing point, a relatively heavy type bar impact will be produced.

In Figure 5, the bail 93 is shown as having been rocked to its other limit position in which the bail stop 96 engages the frame stop 98. Here the axis of the drum E is at its maximum distance from the front lever pivot 13, and, consequently, the driving tooth 27$^a$ of the drum E is about to leave contact with the front lever point 26 while the head of the type bar 4 is spaced a relatively great distance from the platen C. The type bar will have to be driven by its own momentum throughout the remainder of the distance indicated by the dot-dash line, and, since this distance is relatively great, a relatively light type head impact will result. It will be understood that the axis of the drum E may be shifted to intermediate positions by rotation of the stem 99 so as to produce any desired type bar impact within the limits indicated in Figures 4 and 5.

It may be observed that the rocking of the bail 93 to shift the drum E causes, also, a shifting of the escapement wheel 45, whereas the escapement dogs 68 and 69, being carried by the main frame, are not shifted. Consequently, the escapement wheel 45, having one tooth in contact with the escapement dog 68, will turn clockwise as viewed in Figure 1 when the bail is rocked counterclockwise. This will merely increase the "dead" or inactive movement of the drum which will take place prior to engagement of a drum tooth with a front lever point 26, and the proper coaction of the parts will not be impaired.

Further, it will be noted that rocking of the bail 93 will shift the axis of the worm gear 84 while the worm 85 remains stationary. However, the amount of rocking of the bail required for effecting the desired variations in type bar impact is so small that the resultant shifting of the axis of the worm wheel 84 will not deleteriously affect its meshing engagement with the worm gear 85. Thus, in a typical embodiment, the total movement of the axis of the worm wheel on an arc about the pivot screws 94 might be as much as three thirty-seconds of an inch, and the movement would be three sixty-fourths of an inch on each side of a line drawn through the axis of the shaft 28 and perpendicular to the axis of the worm shaft 86. The maximum distance that the worm wheel 84 would be moved away from the worm 85 would be about 0.002 inch out of a total meshing depth of 0.083 inch. This is negligible, and may be ignored for practical purposes, because in practice a meshing depth of 0.081 inch for a twentyfour-pitch worm and wheel will operate as well as a meshing depth of 0.083 inch.

Referring now to the mechanism for automatically starting and stopping the motor H for maintaining the spring motor conditioned or energized for driving the drum E, the shaft 28 is formed with a threaded portion 105 on which is mounted a cylindrical traveling nut 106 apertured to receive for relative sliding movement a pair of pins 107 fixed in the bearing collar 83. A switch 108 mounted, preferably, inside the front frame wall 109, has an operating arm 110 formed with spaced fingers 111 and 112 disposed on opposite sides of the nut 106. In operation, when the electric motor H is not running and the drum E rotates step-by-step under the urge of the spring 78, the nut 106 will be rotated on the shaft 28 while the latter is stationary. Rotation of the nut 106 on the threaded portion 105 of the shaft will cause the nut to travel to the left, as viewed in Figure 2, until it engages the switch arm finger 112 and moves the switch arm 110 to the left to close a circuit to the motor H. The electric motor then will operate and drive the shafts 86 and 28 in the directions indicated by the arrows $a$ in Figures 1 and 2, thereby winding up the spring 78 while the drum E is held stationary by the escapement mechanism. When the shaft 78 is rotated in the direction of its arrow $a$, the nut 106 will move to the right, as viewed in Figure 2, until it engages the switch arm finger 111 and shifts the switch arm 110 to the right, thereby stopping the motor.

The force of type bar impact may be adjusted or varied also by controlling the maximum winding tension imparted to the spring 78. As shown in Figures 16 and 17, the switch 108 is mounted by guide flanges 113 on the front frame wall 109 to shift longitudinally or parallel to the shaft 28. The switch 108 is maintained in adjusted position by means of a stud 114 fast with the switch and extending through a slot 115 in the front frame wall for connection to a finger knob 116 which is recessed to receive a spring 117 bearing against a washer 118 contacting the front frame wall. If the knob 116 and switch 108 are moved bodily toward the right as viewed in Figure 2 and left as viewed in Figure 16, the tension imparted to the spring 78 by operation of the electric motor will be increased, and, conversely, when the switch 108 is shifted in the opposite direction, the maximum tensioning of the spring 78 will be decreased. It will be apparent that a higher spring tension will result in stronger type bar driving impulses than will a lower spring tension.

If two or more key levers should be depressed simultaneously, the associated type bar actions and type bars would be operated together, and the type bars would collide with each other during their printing strokes and would jam or stick, thus arresting rotation of the drum E. In accordance with the invention, means are provided for backing or moving the drum E reversely under such conditions to permit the affected type bar actions and type bars to return to their normal positions and thus to condition the mechanism for further operation. As shown in Figures 1 and 6 to 13, inclusive, a manually operable slide 119 is mounted for fore and aft movement by the front frame wall 109 and a guide bracket 120 supported on the frame. Normally, the slide is held in its forward or retracted position by means of a spring 121 interposed between a pin 122 on the slide and an anchor plate 123 secured to the front frame wall 109, forward movement of the slide 119 under the urge of the spring 121 being limited by engagement of a stop pin 124 with the frame bracket 120. A pawl 125 is formed with an elongated slot 126 through which passes a shoulder screw 127 secured to the slide 119 and mounting the pawl 125 thereon for combined pivotal and sliding movements. The pawl is formed with another elongated slot 128 through which the pin 122 extends, and is urged counterclockwise about the screw 127 by a spring 129 wrapped around the screw 127 and contacting at its opposite ends, respectively, the pin 122 and the top of the slot 128. The pawl is provided with a nose or tooth 130, and the nose end of the pawl normally is disposed just to the rear of and a little below a pin 131 fixed to the slide 119.

Figure 8:
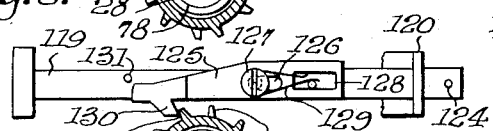
Figure 9:
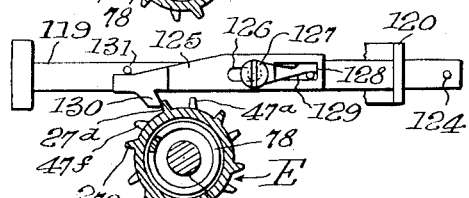
Figure 10:
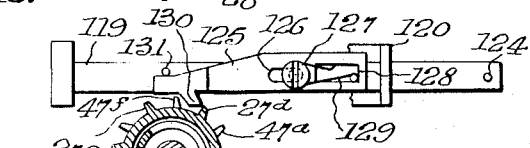

In operation, and assuming that the drum E has been arrested by colliding and sticking of two simultaneously operated type bars, an escapement wheel tooth $47^a$ will be positioned a little in advance of the fixed dog roller 68, as shown in Figure 7, the drum E and escapement wheel 45 being held against rotation by the jammed type actions instead of by the escapement dog 68. In order to release the type actions and restore the parts to operating condition, the slide 119 is pressed rearwardly and carries with it the pawl 125, which at this time does not move relatively to the slide itself. Figure 8 shows the positions of the parts occupied just as the pawl nose 130 engages a drum tooth $27^d$. During the succeeding movement of the slide 119, the pawl 125 will remain stationary, with its nose 130 contacting the drum tooth $27^d$ until the screw 127 carried by the slide 119 moves to and engages the end of the pawl slot 126, as shown in Figure 9. At the same time, the pin 131 on the slide 119 will move over the nose end of the pawl. Continued rearward movement of the slide 119 with the screw 127 bearing against the rear end of the pawl slot 126 will cause the pawl 125 also to be moved rearwardly, so that the nose 130, in engagement with the drum tooth $27^d$, will move the drum E and escapement wheel 45 reversely. When the back of the escapement wheel tooth $47^f$ engages the escapement dog roller 68, the inclined surface 49 on the tooth $47^f$ will cam the dog roller 68 sidewise, as permitted by the pivotal mounting of the rocker plate 61. Thus the escapement wheel tooth $47^f$ will be enabled to pass reversely beyond the escapement dog roller 68, after which the rocker plate 61 will be returned by the spring 62 so as to position the dog roller 68 in front of the escapement wheel tooth $47^f$. This reverse rotation of the drum E will permit the front levers 12, previously engaged by a drum tooth, to be released, thereby enabling the jammed type bars and their associated action mechanisms to be returned to their normal positions.

Figure 11:
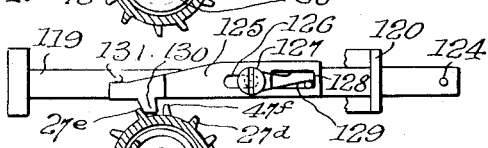
Figure 12:
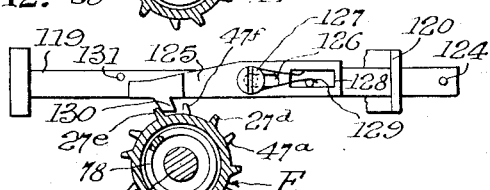
Figure 13:
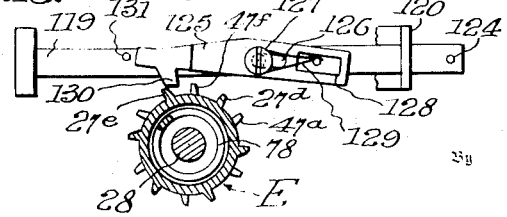
Figure 6:
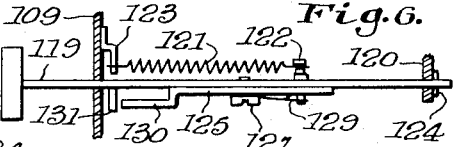
Figure 6 is a fragmentary view of mechanism for moving a power roller reversely, with some parts shown in horizontal section and others in top plan.

When the slide 119 is retracted by the spring 121, it first will move to the position shown in Figure 11, wherein the pawl nose 130 engages the drum tooth $27^e$. At this time the drum is stationary and the pawl nose is held down by the pin 131. Thus the pawl will be held stationary during the next movement of the slide 119 from the position shown in Figure 11 to the position shown in Figure 12, such movement of the slide relative to the pawl being limited in its extent by the length of the pawl slot 126. When the parts have reached the positions shown in Figure 12, the pin 131 will have been moved clear of the nose end of the pawl before the screw 127 engages the left hand end of the slot 126. Further movement of the slide from the position shown in Figure 12 to the position shown in Figure 13 will cause the screw 127 to press against the end of the slot 126 and drive the pawl 125 to the left, this being permitted by the pawl's being cammed up to the Figure 13 position by the rear face of the drum tooth 27e. When the slide is permitted to return to its forward limit position, as shown in Figure 7, the pawl nose will move to the front of the drum tooth 27e and will drop back to its normal position, as shown in Figures 1 and 7.

If an operator should hold a rigid key lever depressed during power operation, not releasing the key lever by the time the associated type bar has returned to its normal position, the momentum acquired by the type bar in its return movement would be sufficient to give a sharp upward jerk on the connections leading to the key lever and impart to it a kickback or jerky movement which would be uncomfortable to the operator. In accordance with the present invention, the type bar assemblies D are so constructed and arranged as to prevent any sudden jerking of the key levers during return movement of the associated type bars even if the operator should hold the key lever depressed. In the form shown, a cushioning spring 132 interposed between the main key lever 29 and the supplemental key lever 30 normally holds the latter downwardly with a stop portion 133 thereon engaging the main key lever 29. A heel or fixing portion 134 at the rear of the supplemental lever 30 extends into a slot 135 formed in the cross bar 18 which mounts the sleeve 17 on which the type bar assemblies are pivoted. The heel 134 overlies a shaft 136 which passes through the sleeve 17 and has a flat surface 137 of relatively short radius which, during power operation of the typewriter, is positioned at the top of the shaft as shown in Figure 1, there being a clearance of about one-sixteenth of an inch between the bottom of the supplemental key lever heels 134 and the flat surface 137. When a key lever 29 is depressed to cause power operation of a type bar, the spring 132 will cause the supplemental lever 30 to rock downwardly with the key lever 29 so as to pull down on the link 14 and effect operation of the type bar in the manner previously described. When a type bar 4 and its associated actuating mechanism return to their normal positions following a power actuation, the counterclockwise swinging of the front lever 12 will cause the lower end of the slot 15 suddenly to pick up the link 14 with a jerky movement if the key lever assembly has not been released by the operator. The sudden picking up of the link 14 will cause the supplemental lever to rock slightly about the pivot 31 as permitted by yielding of the spring 132 and the clearance between the bottom of the heel 134 and flat 137 on the shaft 136. Thus, no disagreeable shock is transmitted to the operator's finger. The spring 132 will, of course, return the supplemental lever 30 to its normal position relative to the main key lever 129 after the shock has been dissipated or absorbed.

At times it may be desirable to operate the type bars by manually applied force transmitted directly from the key lever assemblies D instead of relying upon the drum E for supplying the driving force. In accordance with the invention, optionally operable means are provided for simultaneously conditioning the key lever assemblies to transmit manually applied force to the type bars, and for also breaking the circuit to the electric motor H and disabling the escapement mechanism F. In the form shown, a switch 138 included in the circuit of the motor E is mounted on an end wall 139 of the frame A as shown in Figures 14 and 15. The switch includes a finger piece 140 arranged to operate a switch stem 141 which, at its inner end, is bifurcated to receive a tongue 142 at the adjacent end of the shaft 136. Secured to the shaft 136 is a rock arm 143 connected by a link 144 to an ear 145 on the universal front cross bar 37. When it is desired to operate the type bars manually instead of by means of the powered drum E, the switch finger piece 140 is rotated ninety degrees from the position shown in full lines in Figure 15 to the position shown in dotted lines, thereby simultaneously breaking the circuit to the motor H, and moving the shaft 136, the arm 143, the link 144, and the universal front cross bar 37 to the positions shown in Figure 3. With the parts so positioned, the heels 134 of the supplemental levers 30 will contact with the round surface portion of the shaft 136 of relatively long radius, and fix the levers 29 and 30 to move together. Consequently, when a key lever 29 is depressed, the manually applied force will be transmitted directly to the type actions without any yielding of the spring 132, and consequently without any diminishing of the manually applied effort. Inasmuch as the universal front cross bar 37 has been moved from underneath the depending key lever ears 39, depression of the key levers will not actuate the escapement mechanism F, and consequently the drum E will remain inactive.

The electrical circuit for the motor H is controlled by the two switches 108 and 138. Any suitable circuit or wiring arrangement may be employed. One such circuit is shown in Figure 21, wherein one side 146 of a supply line leads through the switch 138 and thence through a conductor 147 to one side of the motor H. The other side of the motor H is connected through a conductor 148 to the switch 108 which in turn is connected to the other side 149 of the supply line.

Figures 22, 23, 24, and 25 show a modified form of actuator especially adapted for very rapid typing. The link 11 of each type action is connected at its front end to an actuator or front lever 212 pivoted as at 213 on the frame A, and formed with a curved slot 215 which receives the upper end of the link 14. A pawl 216 is pivoted as at 217 on the actuator 212. A holding spring 218 wrapped around a stud 219 has its opposite ends fitted to the actuator 212 as at 220 and 221. The spring is contacted by a heel button 222 on the pawl 216 so as normally to maintain the pawl releasably against a stop ear 223, as shown in Figure 22. The pawl 216 and front lever or actuator 212 normally are maintained in the positions shown in Figure 22 by means of a spring 224 connected between a pawl-aligning plate 225 and the pawl 216. When the parts are in these positions, the nose 226 of the pawl is disposed beyond the path of the teeth on the drum E.

When a key lever assembly is depressed and the link 14 is moved downwardly, the front lever 212 will be rocked clockwise, as viewed in Figure 22, so as to move the pawl nose 226 to the position indicated in dotted lines, wherein the pawl nose is disposed in the path of the drum tooth 27a. During this initial rocking of the actuator 212, the coil spring 224 is not tensioned very much, and the holding force of the spring 218 exerted upon the pawl heel 222 will be sufficient to maintain the pawl up against the stop ear 223. Further depression of the key lever assembly will actuate the escapement mechanism F in the manner already described, so as to permit the spring 78 to drive the drum E one-sixth of a revolution, whereupon the drum tooth 27ᵃ will engage the pawl nose 226 and rock the pawl 216 and actuator 212 together about the pivot 213 to drive the type bar to the printing position. When the pawl and actuator are driven by the drum tooth, the pawl nose 226 will move over a smooth, arcuate path 227.

Figure 23 shows the parts in the positions they will occupy shortly after the drum tooth 27ᵃ has passed out of contact with the pawl nose 226. As soon as the pawl nose is released by the drum tooth 27ᵃ, the pawl will be rocked counterclockwise about the pivot 217 by the force exerted by the considerably tensioned returning spring 224. This movement of the pawl will take place before any substantial reverse rocking of the actuator 212 has taken place, and the pawl nose will be moved down along a path 228ᵃ and out of the path of the drum tooth 27ᵃ which is to move into active position upon the next actuation of a key lever assembly. When the pawl nose has completed its movement along the path 228ᵃ, a heel 229 on the pawl will engage the stop ear 223, so that the spring 224 then will move the pawl 216 and actuator 212 together, with the pawl nose tracing a path 228ᵇ, and until the pawl engages the aligning plate 225, whereupon the actuator 212 will continue to swing counterclockwise until the stop ear 223 again engages the pawl 216, as shown in Figure 22. This last stage of operation, which takes place while the pawl is contacting the aligning plate 225 and the actuator 212 is still returning, is indicated by the path of the pawl nose 226 traced at 228ᶜ. Thus, during the whole of the return movement, the pawl nose 226 returns over a path 228ᵃ, 228ᵇ, 228ᶜ out of reach of the teeth on the drum E Consequently, if another key lever is depressed and the drum E released before the actuator 212 has been returned to its initial position, the actuator will not be drivingly connected to the drum tooth 27ᶠ during return movement of the actuator. This prevention of an actuator's engaging a drum tooth during the return stroke of the actuator eliminates the danger of jamming of the type bars caused by rapid typing.

The proper setting of the pawls in their normal or at-rest positions may be effected by shifting the pawl-aligning plate 225 fore or aft on a bracket 229 carried by the frame. Slots 230 formed in the plate receive locking screws 231 which have threaded connection with the brackets 229 at opposite ends of the plate 225, and permit the desired fore and aft adjusting movement.

The actuator mechanism disclosed in Figures 22 to 25, inclusive, may be embodied in a typewriter equipped with means for conditioning the typewriter selectively for power operation or manual operation. During manual operation, the rocking of the pawls 216 would not be objectionable, and the springs 224 will assist in returning the type bars to their normal positions.

Figure 26 shows modified mechanism for exerting upon the drum E the desired constant urge to rotate the drum under the control of the escapement mechanism F. In this embodiment, the spring motor is dispensed with, and the drum is adapted to be driven directly from the motor H through a friction drive transmission device generally designated I. In the illustrative embodiment, a screw 381 secures the drum E, bearing collar 46, and shaft 28 together to rotate in unison, and a worm wheel 384 is mounted to rotate freely on the shaft 28. Clutch plates 385 and 386 equipped, respectively, with friction facings 387 and 388, of leather or other suitable facing material, are mounted on the shaft 28 on opposite sides of the worm wheel 384. The clutch plate 385 is provided with a pin 389 which is slidable in a slot 390 in the shaft 28. A spring 391 is interposed between the escapement wheel 45 and the clutch disc 385, and another spring 392 is interposed between the clutch disc 386 and a bearing race 393. The bearing race 393 is adapted to roll on ball bearings 394 in turn rolling upon a race 395 pressed up against the bearing 91 of the shaft 28. The race 393 has integral therewith a sleeve 396 which extends within the hub of the clutch disc 386. A pin 397 secures the sleeve 396 to the shaft 28 and has its projecting ends received in slots 398 extending axially in the hub of the clutch disc 386. Thus the disc 386 is constrained to rotate with the shaft 28 and sleeve 396, but can slide axially with respect to the shaft and disc so as to permit the spring 392 to urge the clutch disc 386 toward the worm wheel 384. The outer end of the sleeve 396 abuts the side of the worm wheel 384, thereby locating the worm wheel relative to the worm 85 irrespective of wear of the friction facing 388 or yielding of the spring 392. The end thrust of the worm wheel thus normally is resisted by the left end of the sleeve 396, but is only slight because of the pressure of the disc 386. The ball bearings 394 and race 393 are normally stationary and serve to take up the end thrust due to action of the worm 85 and thus facilitate and permit more instantaneous rotation of the drum E when the escapement is released. In operation, the motor H operates to drive the worm wheel 384 constantly. The escapement mechanism normally prevents rotation of the drum E and shaft 28, as is permitted by slipping of the worm wheel 384 on the friction facings 387 and 388 of the discs 385 and 386. When, however, the escapement is operated to release the drum E, driving power will be transmitted frictionally from the worm wheel 384 to the clutch discs 385 and 386, and thence to the shaft 28 and drum E, rotating the latter until it is stopped by engagement of one of its teeth with the escapement dog 69.

It will be apparent that the type bar operating mechanism disclosed herein is simple and compact, being so fitted in amongst conventional parts of the typewriter as to result in little if any increase in the overall size of the typewriter. The drum, actuators, and escapement mechanism, being positioned in front of the type bar head rest and under the removable or liftable hood, are easily accessible for adjustment or servicing. Although the type bars may be driven with force sufficient to make a large number of good carbon copies, the construction is such that undue shocks are avoided and rapid, quiet operation results. The disclosed arrangements of type bar actuating mechanism have the advantage that the key acts directly upon the type bar itself while moving the actuator nose into the path of teeth on the power drum. This increases the speed of the type bar because the bar will already be moving at the time a tooth engages the actuator nose or point, and the power mechanism therefore only has to overtake, engage, and then continue the driving of the actuator, instead of moving it from a position of rest. A related feature is that the actuator point is brought into the path of the teeth on the drum substantially in the direction of movement of the teeth, so that a tooth comes up behind or overtakes the moving actuator and then accelerates it to give an accelerated movement to the associated type bar.

The constructions shown embody the invention in the form now preferred, but it will be understood that changes may be made without departing from the invention as defined in the claims.

I claim:

1. In a front strike typewriter, a frame having a front wall; a plurality of type bars pivoted intermediate the rear and front of the frame; a plurality of actuators for said type bars respectively mounted adjacent the front of the frame; means respectively connecting said actuators to said type bars; rotatable driving means for said actuators extending longitudinally of said frame in front of said type bars and adjacent the top of the frame above said actuators; a plurality of key levers pivoted rearwardly of said actuators and extending forwardly under the actuators; and means connecting said key levers to said actuators respectively for effecting selective engagement of said actuators with said driving means to operate said type bars, said driving means and said actuators being mounted close to the front wall of the frame and in front of the arcs of movement of said type bars.

2. In a front strike typewriter, a frame having a front wall; a plurality of type bars pivoted intermediate the rear and front of the frame; a plurality of actuators for said type bars respectively mounted adjacent the front of the frame; means respectively connecting said actuators to said type bars; rotatable driving means for said actuators extending longitudinally of said frame in front of said type bars and adjacent the top of the frame above said actuators; a plurality of key levers pivoted rearwardly of said actuators and extending forwardly under the actuators; means connecting said key levers to said actuators respectively for effecting selective engagement of said actuators with said driving means to operate said type bars; means tending to drive said rotatable driving means; escapement mechanism for restraining operation of said driving means; and connections between said key levers and said escapement mechanism for effecting temporary release of said driving means to permit sufficient movement thereof to produce type bar actuation, said driving means, said actuators, said escapement mechanism, the means connecting the key levers to the actuators, and the connections between the key levers and said escapement mechanism being mounted close to the front wall of the frame and in front of the arcs of movement of said type bars.

3. In a front strike typewriter, a frame having a front wall; a plurality of type bars pivoted intermediate the rear and front of the frame; a plurality of actuators for said type bars respectively mounted adjacent the front of the frame; means respectively connecting said actuators to said type bars; rotatable driving means for said actuators extending longitudinally of said frame in front of said type bars and adjacent the top of the frame above said actuators; a plurality of key levers pivoted rearwardly of said actuators and extending forwardly under the actuators; means connecting said key levers to said actuators respectively for effecting selective engagement of said actuators with said driving means to operate said type bars; a spring motor tending to drive said rotatable driving means; means mounting said spring motor adjacent the top of said frame front wall; escapement mechanism for restraining operation of said driving means; connections between said key levers and said escapement mechanism for effecting temporary release of said driving means to permit sufficient movement thereof to produce type bar actuation; an electric motor mounted at the rear and bottom of said frame; and re-wind connections between said electric motor and said spring motor whereby said spring motor can be rewound by operation of said electric motor.

4. In a front strike typewriter, a frame having a front wall; a plurality of type bars pivoted intermediate the rear and front of the frame; a plurality of actuators for said type bars respectively mounted adjacent the front of the frame; means respectively connecting said actuators to said type bars; rotatable driving means for said actuators extending longitudinally of said frame in front of said type bars and adjacent the top of the frame above said actuators; a plurality of key levers pivoted rearwardly of said actuators and extending forwardly under the actuators; means connecting said key levers to said actuators respectively for effecting selective engagement of said actuators with said driving means to operate said type bars; a spring motor tending to drive said rotatable driving means; means mounting said spring motor adjacent the top of said frame front wall; escapement mechanism for restraining operation of said driving means; connections between said key levers and said escapement mechanism for effecting temporary release of said driving means to permit sufficient movement thereof to produce type bar actuation; and electric motor mounted at the rear and bottom of said frame; and re-wind connections between said electric motor and said spring motor whereby said spring motor can be rewound by operation of said electric motor, said re-wind connections including a shaft extending at an inclination from the lower rear part of the typewriter frame to the upper front part thereof.

5. In a front strike typewriter, a frame having a front wall; a plurality of type bars pivoted intermediate the rear and front of the frame; a type bar rest mounted rearwardly of said frame front wall; a plurality of type bar actuators pivotally mounted to rock about an axis extending longitudinally of said frame behind the front wall thereof and in front of said type bar head rest; means respectively connecting said actuators to said type bars; a rotatable member extending parallel to and above the axis of said actuators adjacent said frame front wall and in front of said type bar head rest; a plurality of key levers projecting from in front of said frame front wall to within said frame and being mounted on said frame; links connecting said key levers to said actuators respectively for effecting selective engagement of said actuators with said rotatable member to operate said type bars; means tending to drive said rotatable member; escapement mechanism for restraining rotation of said rotatable member, said escapement mechanism including an escapement wheel coaxial with said rotatable member and escapement dog means mounted above said escapement wheel; and connections between said key levers and said dog means including a link extending vertically in front of said type bar head rest.

6. In a typewriter or like machine, a frame;

a plurality of type bars mounted thereon; a power driven rotatable member; a plurality of movably mounted actuators connected respectively to said type bars and being adapted to be brought into operative engagement with said rotatable member to be driven thereby; escapement mechanism normally restraining said rotatable member against rotation; a plurality of key levers adapted to be connected to said escapement mechanism and connected respectively to said actuators for selectively conditioning said actuators for engagement with said rotatable member and for operating said escapement mechanism to release said rotatable member temporarily for driving the conditioned actuator and moving the associated type bar on a printing stroke; and means for shifting the axis of said rotatable member relative to the mounting of the actuators to thereby vary its arc of contact with the conditioned actuator and consequently vary the force of the type bar impact.

7. In a typewriter or like machine, a frame; a plurality of type bars mounted thereon; a power driven rotatable drum formed with a plurality of longitudinally extending circumferentially spaced teeth; a plurality of actuators movably mounted on said frame and normally being beyond the path of the drum teeth; connections between said actuators and said type bars respectively; an escapement wheel rotatable with said drum; escapement dog means movably mounted on said frame and normally cooperating with said escapement wheel to restrain the drum against rotation; a plurality of key levers; connections between the key levers and said actuators and between the key levers and said dog means operative upon depression of a key lever for moving an associated actuator to position a part thereof in the path of rotation of a drum tooth and for operating said dog means to release said escapement wheel and bring about a partial rotation of said drum with consequent driving of said actuator and its associated type bar; means mounting said drum to shift bodily with respect to both said dog means and the mounting of said actuators; and adjusting means for effecting such shifting of said drum to thereby vary the arc of contact of the drum teeth with said actuators.

8. In a typewriter or like machine, a frame; a plurality of type bars mounted thereon; a power driven rotatable drum formed with a plurality of longitudinally extending circumferentially spaced teeth; a plurality of actuators movably mounted on said frame and normally being beyond the path of the drum teeth; connections between said actuators and said type bars respectively; an escapement wheel rotatable with said drum; escapement dog means movably mounted on said frame and normally cooperating with said escapement wheel to restrain the drum against rotation; a plurality of key levers; connections between the key levers and said actuators and between the key levers and said dog means operative upon depression of a key lever for moving an associated actuator to position a part thereof in the path of rotation of a drum tooth and for operating said dog means to release said escapement wheel and bring about a partial rotation of said drum with consequent driving of said actuator and its associated type bar; a bail on which the drum and escapement wheel are journaled; means pivoting the bail to rock on said frame and shift said drum and escapement wheel bodily with respect to both said dog means and the mounting of said actuators; and adjusting means for effecting such shifting of said bail to thereby vary the arc of contact of the drum teeth with said actuators.

9. In a typewriter or like machine, a frame; a plurality of type bars mounted thereon; a power driven rotatable drum formed with a plurality of longitudinally extending circumferentially spaced teeth; a plurality of actuators movably mounted on said frame and normally being beyond the path of the drum teeth; connections between said actuators and said type bars respectively; an escapement wheel rotatable with said drum; escapement dog means movably mounted on said frame and normally cooperating with said escapement wheel to restrain the drum against rotation; a plurality of key levers; connections between the key levers and said actuators and between the key levers and said dog means operative upon depression of a key lever for moving an associated actuator to position a part thereof in the path of rotation of a drum tooth and for operating said dog means to release said escapement wheel and bring about a partial rotation of said drum with consequent driving of said actuator and its associated type bar; a bail on which the drum and escapement wheel are journaled; means pivoting the bail to rock on said frame and shift said drum and escapement wheel bodily with respect to both said dog means and the mounting of said actuators; a manually operable adjusting screw connected to said bail for rocking said bail about its pivots on the frame; and stop means for limiting such rocking of said bail.

10. In a typewriter or like machine, a main frame; a plurality of type bars mounted thereon; a power driven rotatable member; a plurality of movably mounted actuators connected respectively to said type bars and being adapted to be brought into operative engagement with said rotatable member to be driven thereby; an escapement wheel rotatable with said rotatable member; an escapement plate; an escapement dog fixed on said plate cooperable with said escapement wheel; another dog movably mounted on said escapement plate and cooperable with said escapement wheel; an escapement frame; means mounting said escapement plate to rock on said escapement frame; means providing a yielding cushioned mounting of said escapement frame on said main frame; a plurality of key levers connected respectively to said actuators for conditioning a selected one of said actuators for engagement with said rotatable member; and means operable by any one of said key levers for rocking said escapement plate to release said escapement wheel and bring about angular movement of said rotatable member about its axis and consequent driving of said conditioned actuator and its associated type bar.

11. In a typewriter or like machine, a main frame; a plurality of type bars mounted thereon; a power driven rotatable member; a plurality of movably mounted actuators connected respectively to said type bars and being adapted to be brought into operative engagement with said rotatable member to be driven thereby; an escapement wheel rotatable with said rotatable member; an escapement plate; an escapement dog fixed on said plate cooperable with said escapement wheel; another dog movably mounted on said escapement plate and cooperable with said escapement wheel; an escapement frame; means mounting said escapement plate to rock on said escapement frame; means pivoting said escapement frame to rock about an axis parallel to the axis of said escapement wheel; stops on the main frame and escapement frame respectively for limiting such rocking of said escapement frame; resilient means for yieldably maintaining said escapement frame at one limit of its rocking movement; a plurality of key levers connected respectively to said actuators for conditioning a selected one of said actuators for engagement with said rotatable member; and means operable by any one of said key levers for rocking said escapement plate to release said escapement wheel and bring about angular movement of said rotatable member about its axis and consequent driving of said conditioned actuator and its associated type bar.

12. In a typewriter or like machine, a main frame; a plurality of type bars mounted thereon; a power driven rotatable member; a plurality of movably mounted actuators connected respectively to said type bars and being adapted to be brought into operative engagement with said rotatable member to be driven thereby; an escapement wheel rotatable with said rotatable member; an escapement plate; an escapement dog fixed on said plate cooperable with said escapement wheel; another dog movably mounted on said escapement plate and cooperable with said escapement wheel; means mounting said escapement plate to rock on said escapement frame; means providing a yielding cushioned mounting of said escapement frame on said main frame; a plurality of key levers connected respectively to said actuators for conditioning a selected one of said actuators for engagement with said rotatable member; and means including a link operable by any one of said key levers for rocking said escapement plate to release said escapement wheel and bring about angular movement of said rotatable member about its axis and consequent driving of said conditioned actuator and its associated type bar, said link being provided with a device for adjusting the effective length of the link to thereby vary the relative timing of the conditioning of the actuators for engagement with said rotatable member and the operation of said escapement plate.

13. In a typewriter or like machine, a main frame; a plurality of type bars mounted thereon; a power driven rotatable member; a plurality of movably mounted actuators connected respectively to said type bars and being adapted to be brought into operative engagement with said rotatable member to be driven thereby; an escapement wheel rotatable with said rotatable member; an escapement plate; an escapement dog fixed on said plate cooperable with said escapement wheel; another dog movably mounted on said escapement plate and cooperable with said escapement wheel; means mounting said escapement plate to rock on said main frame; a plurality of key levers connected respectively to said actuators for conditioning a selected one of said actuators for engagement with said rotatable member; and connections between said key levers and said escapement plate for rocking the latter to release said escapement wheel and bring about angular movement of said rotatable member about its axis and consequent driving of said conditioned actuator and its associated type bar, said last-named connections including a link and a turnbuckle interposed therein for adjusting the effective length of the link and thereby varying the relative timing of the conditioning of said actuators and the rocking of said escapement plate.

14. In a typewriter or like machine, a plurality of type bars; a power driven member for operating said type bars; escapement mechanism controlling the operation of said power driven member and normally restraining it; key-operated mechanism for connecting selected type bars to said power driven member and for operating said escapement mechanism to permit said power driven member to operate a selected type bar, said key operated mechanism being capable of operating said type bars independently of said power driven member; and means operative upon said key operated mechanism for rendering the latter incapable of operating said escapement mechanism, to thereby permit manual key actuation of said type bars.

15. In a typewriter or like machine, a plurality of type bars; a power driven member for operating said type bars; an electric motor for energizing said power driven member; a switch in circuit with said motor; escapement mechanism controlling the operation of said power driven member and normally restraining it; key-operated mechanism for connecting selected type bars to said power driven member and for operating said escapement mechanism to permit said power driven member to operate a selected type bar, said key-operated mechanism being capable of operating said type bars independently of said power driven member; and means for simultaneously opening said switch and rendering said key-operated mechanism incapable of operating said escapement mechanism, to thereby permit manual key actuation of said type bars.

16. In a typewriter or like machine, a plurality of type bars; a power driven member for operating said type bars; escapement mechanism controlling the operation of said power driven member and normally restraining it; a plurality of key levers; mechanism operated by said key levers for connecting selected type bars to said power driven member, said key-lever-operated mechanism being capable of operating said type bars independently of said power driven member; means including a universal bar connected to said escapement mechanism and being adapted to be in the path of said key levers whereby operation of a key lever will operate said escapement mechanism to permit said power driven member to operate a selected type bar; and means for effecting relative displacement of the universal bar and the key levers whereby the universal bar will be out of the paths of the key levers and operation of a key lever will not operate said escapement mechanism.

17. In a typewriter or like machine, a plurality of type bars; a power driven member for operating said type bars; an electric motor for energizing said power driven member; a switch in circuit with said motor; escapement mechanism controlling the operation of said power driven member; a plurality of key levers; mechanism operated by said key levers for connecting selected type bars to said power driven member, said key-lever-operated mechanism being capable of operating said type bars independently of said power driven member; escapement mechanism operating means including a universal bar connected to said escapement mechanism and being adapted to be operated by said key levers to operate said escapement mechanism to permit said power driven member to operate a selected type bar; and means for both opening said switch and disabling said escapement mechanism operating means.

18. In a typewriter or like machine, a plurality of type bars; a power-operable drum; at least one tooth extending longitudinally on said drum; power means tending to rotate said drum; escapement means normally restraining said drum against rotation; a plurality of actuators connected respectively to said type bars and being spaced along said drum and normally out of the path of said tooth; a plurality of key levers; means respectively connecting said key levers to said type bars for operating them independently of operation of said drum and connecting said key levers respectively to said actuators for positioning them to be engaged and operated by said drum tooth upon rotation of said drum; a universal bar extending in the paths of operating movement of said key levers; means connecting said universal bar to said escapement mechanism for operating the latter to release said drum when a key is depressed and an associated actuator has been positioned in the path of said drum tooth; and means for shifting said universal bar out of the paths of said key levers to permit depression of the key levers without operating the escapement mechanism to effect actuation of said type bars independently of said drum.

19. In a typewriter or like machine, a plurality of type bars; a power-operable drum; at least one tooth extending longitudinally on said drum; power means tending to rotate said drum; escapement means normally restraining said drum against rotation; a plurality of actuators connected respectively to said type bars and being spaced along said drum and normally out of the path of said tooth; a plurality of key levers; means respectively connecting said key levers to said type bars for operating them independently of operation of said drum and connecting said key levers respectively to said actuators for positioning them to be engaged and operated by said drum tooth upon rotation of said drum; a universal assembly including rockable side arms and a universal bar pivoted on said side arms and adapted to extend in the paths of operating movement of said key levers; means connecting one of said side arms to said escapement mechanism for operating the latter to release said drum when a key has been depressed and an associated actuator has been positioned in the path of said drum tooth; and means for rocking said universal bar about its pivot on said side arms and out of the paths of said key levers to permit depression of said key levers without operating the escapement mechanism to effect manual actuation of said type bars independently of said drum.

20. In a typewriter or like machine, a plurality of type bars; a power-operable drum; at least one tooth extending longitudinally on said drum; a spring motor tending to rotate said drum; an electric motor for winding said spring motor; a switch in circuit with said electric motor; escapement means normally restraining said drum against rotation; a plurality of actuators connected respectively to said type bars and being spaced along said drum and normally out of the path of said tooth; a plurality of key levers; means respectively connecting said key levers to said type bars for operating them independently of operation of said drum and connecting said key levers respectively to said actuators for positioning them to be engaged and operated by said drum tooth upon rotation of said drum; a universal assembly including rockable side arms and a universal bar pivoted on said side arms and adapted to extend in the paths of operating movement of said key levers; means connecting one of said side arms to said escapement mechanism for operating the latter to release said drum when a key has been depressed and an associated actuator has been positioned in the path of said drum tooth; and means for both opening said switch and rocking said universal bar about its pivot on said side arms and out of the paths of said key levers to permit depression of said key levers without operating the escapement mechanism to effect manual actuation of said type bars independently of said drum.

21. In a typewriter or like machine, a plurality of pivoted type bars; a power-operable member; a plurality of pivoted actuators connected respectively to said type bars and normally being operatively disassociated from said power-operable member; a plurality of key levers; curved slots formed respectively in said actuators; and links pivoted to said key levers and being received for sliding movement in said slots respectively whereby a depression of a key lever will rock the associated actuator into the path of said power-operable member to be engaged and driven thereby after which the power-operable member will drive the actuator and its associated type bar without causing further movement of said key lever.

22. In a typewriter or like machine, a plurality of type bars; a power-driven member for operating said type bars; a plurality of actuators connected respectively to said type bars and normally being disconnected from said power-driven member; a plurality of key levers; means respectively connecting said key levers to said actuators and being operative upon depression of an associated key lever for first starting the associated type bar on an operating movement by force applied manually on the key lever and for then bringing the associated actuator into operative engagement with said power-driven member to be driven thereby to complete the operating movement of said type bar by power supplied by said power-driven member, said connecting means including an anti-kick-back cushioning device interposed between each key lever and the associated actuator.

23. In a typewriter or like machine, a plurality of type bars; a power-driven member for operating said type bars; a plurality of actuators connected respectively to said type bars and normally being disconnected from said power-driven member; a plurality of key levers; means respectively connecting said key levers to said actuators and being operative upon depression of an associated key lever for first starting the associated type bar on an operating movement by force applied manually on the key lever and for then bringing the associated actuator into operative engagement with said power-driven member to be driven thereby to complete the operating movement of said type bar by power supplied by said power-driven member, said connecting means including a lost-motion device and an anti-kick-back spring interposed between each key lever and its associated actuator.

24. In a typewriter or like machine, a plurality of type bars; a power driven member for operating said type bars; a plurality of actuators formed with slots connected respectively to said type bars and normally being disconnected from said power driven member; a plurality of key levers; and means respectively connecting said key levers to said actuators for effecting connection of said actuators to said power driven member for driving said actuators and their associated type bars, said means including between each key lever and the associated actuator a link slidable in the slot of said actuator and a spring connection between said key lever and said link.

25. In a typewriter or like machine, a plurality of type bars; a power driven member for operating said type bars; a plurality of actuators connected respectively to said type bars and normally being disconnected from said power driven member; a plurality of key levers; means respectively connecting said key levers to said actuators for selectively effecting connection of said actuators to said power driven member for effecting power drive of said type bars or alternatively for transmitting manual effort from said key levers to said actuators sufficient to operate said type bars independently of said power driven member, said means including an anti-kick-back cushioning device interposed between each key lever and its associated actuator; and means for selectively rendering said device effective for anti-kick-back cushioning of the key levers to condition the machine for power operation, and for rendering said devices ineffective as cushioning to thereby establish relatively uncushioned connection between said key levers and said actuators to condition the machine for manual operation.

26. In a typewriter or like machine, a plurality of type bars; an intermittently operable member; means for operating said intermittently operable member; a plurality of actuators connected respectively to said type bars and normally being disconnected from said intermittently operable member; a plurality of key levers; means respectively connecting said key levers to said actuators for effecting connection of said actuators to said intermittently operable member to be driven thereby to operate said type bars and being adapted also to transmit manual effort from said key levers for operating said type bars independently of said intermittently operable member, said means including an anti-kick-back cushioning device interposed between each key lever and the associated actuator to condition the machine for operation of said type bars by said intermittently operable member without kick-back on the key levers; escapement means operable by said key levers for effecting operation of said intermittently operable member; and means including a single manually operable member for both disabling said escapement means and for rendering said anti-kick-back devices ineffective as cushions and establishing relatively uncushioned connection between said key levers and said actuators.

27. In a typewriter or like machine, a plurality of type bars; a spring motor; a plurality of actuators connected respectively to said type bars and normally being disconnected from said spring motor; a plurality of key levers; means respectively connecting said key levers to said actuators for effecting connection of said actuators to said spring motor to be driven thereby to operate said type bars and being adapted also to transmit manual effort from said key levers for operating said type bars independently of said spring motor, said means including an anti-kick-back cushioning device interposed between each key lever and the associated actuator to condition the machine for operation of said type bars by said spring motor without kick-back on the key levers; escapement means operable by said key levers for effecting operation of said spring motor; an electric motor for rewinding said spring motor; a switch in circuit with said electric motor; and means including a single manually operable member for disabling said escapement means, for rendering said anti-kick-back devices ineffective as cushions and establishing relatively uncushioned connection between said key levers and said actuators, and for opening said switch.

28. In a typewriter or like machine, a plurality of type bars; a power driven member for operating said type bars; a plurality of actuators connected respectively to said type bars and normally being disconnected from said power driven member; a plurality of key levers; means respectively connecting said key levers to said actuators for selectively effecting connection of said actuators to said power driven member for effecting power drive of said type bars or alternatively for transmitting manual effort from said key levers to said actuators sufficient to operate said type bars independently of said power driven member, said means including a supplemental member mounted on and to move relatively to said key lever, a spring yieldably restraining movement of said supplemental member on said key lever, and a connection between said supplemental member and the associated actuator; optionally operable means for constraining said supplemental member to move in unison with said key lever and without substantial movement relatively thereto; and means for selectively conditioning said optionally operable means to free said supplemental member to condition the machine for power operation of the type bars without kick-back on the key levers or for conditioning said optionally operable means to constrain said supplemental member to move in unison with said key lever to thereby condition the machine for manual operation of the type bars.

29. In a typewriter or like machine, a plurality of type bars; a power driven member for operating said type bars; a plurality of actuators connected respectively to said type bars; a shaft having a surface of relatively long radius and a surface of relatively short radius; a plurality of main key levers pivoted to rock about said shaft; supplemental key levers pivoted on said main key levers respectively and having stop portions engageable with the associated main key levers and fixing portions extending transversely of and adjacent said shaft; springs respectively interposed between associated main and supplemental key levers for urging said stop portions towards said main key levers; links respectively connecting said supplemental key levers to said actuators; and means for rotating said shaft selectively to present said surface of relatively long radius adjacent said fixing portions to prevent pivotal movement of said supplemental key levers on said main key levers, or to present the surface of relatively short radius adjacent said fixing portions to provide resultant clearance between said shaft and said fixing portions to thereby enable said supplemental levers to have limited pivotal movement on their associated main key levers.

30. In a typewriter or like machine, a shaft having a surface of relatively long radius and a surface of relatively short radius, a key lever assembly mounted to rock about said shaft and including a main key lever, a supplemental key lever pivoted on said main key lever, a stop portion on said supplemental key lever adapted to engage said main key lever for limiting pivotal movement of said supplemental key lever on said main key lever in one direction, a spring interposed between said main and supplemental key levers and urging said stop portion against said main key lever, and a heel on said supplemental key lever engageable with said shaft for limiting pivotal movement of said supplemental key lever on said main key lever in the opposite direction; and means for rotating said shaft selectively to present said relatively long radius surface adjacent said heel to hold said stop portion against said main key lever, or to present said relatively short radius surface adjacent said heel to provide resultant clearance between said heel and said shaft to thereby permit limited pivotal movement of said supplemental key lever on said main key lever.

31. In a typewriter or like machine, a plurality of type bars; a plurality of actuators respectively connected to said type bars; a spring motor for operating said actuators comprising a hollow drum engageable exteriorly with said actuators, and a spring housed within said drum; and key-controlled means for bringing about operation of said spring motor and operative engagement of selected actuators therewith.

32. In a typewriter or like machine, a plurality of type bars; a plurality of actuators respectively connected to said type bars; a spring motor for operating said actuators comprising a hollow drum engageable exteriorly with said actuators, and a spring housed within said drum; escapement mechanism for controlling operation of said spring motor and including an escapement wheel rotatable with said drum; a shaft for rewinding said spring, said drum, said shaft, and said escapement wheel being axially aligned; and key-controlled means for bringing about operation of the escapement mechanism and operative connection of selected actuators to said drum.

33. In a typewriter or like machine, a plurality of type bars; a rotatable drum; key-controlled actuators for transmitting drive from said drum to said type bars respectively; a spring for driving said drum; an electric motor; a shaft rotatable by said motor for rewinding said spring, said shaft having a threaded portion; a traveling nut having threaded engagement with said threaded portion; a pin parallel to said shaft end being rotatable about said shaft by rotation of said drum and extending slidably through said nut whereby relative rotation of said drum and shaft will cause the nut to travel endwise on said shaft; a switch in circuit with said electric motor; and means operable by endwise travel of said nut for turning the switch off or on depending upon the direction of such endwise travel.

34. In a typewriter or like machine, a plurality of type bars; a shaft having a threaded portion; a drum rotatable on said shaft; key-controlled actuators for transmitting drive from said drum to said type bars respectively; a spring coiled about said shaft within said drum and having its opposite ends connected to said drum and said shaft respectively; an electric motor connected to said shaft for rotating it to rewind said spring; a traveling nut on said shaft threaded portion; a pin fixed to said drum and extending slidably through said nut and parallel to said shaft to effect relative rotation of the nut and shaft and endwise travel of the nut in response to relative rotation of the shaft and drum; a switch in circuit with said electric motor; and switch-operating fingers disposed on opposite sides of the nut longitudinally of said shaft and being respectively engageable by the nut during travel thereof endwise in opposite directions for turning the switch off and on.

35. In a typewriter or like machine, a plurality of type bars; a shaft having a threaded portion; a drum rotatable on said shaft; key-controlled actuators for transmitting drive from said drum to said type bars respectively; a spring coiled about said shaft within said drum and having its opposite ends connected to said drum and said shaft respectively; an electric motor connected to said shaft for rotating it to rewind said spring; a traveling nut on said shaft threaded portion; a pin fixed to said drum and extending slidably through said nut and parallel to said shaft to effect relative rotation of the nut and shaft and endwise travel of the nut in response to relative rotation of the shaft and drum; a switch in circuit with said electric motor; a switch-operating arm provided with fingers disposed on opposite sides of the nut longitudinally of the shaft and being respectively engageable by said nut in response to endwise travel of said nut in opposite directions for turning the switch off and on; and means for mounting said switch-operating arm in adjusted positions longitudinally of said shaft.

36. In a typewriter or like machine, a plurality of type bars; a shaft having a threaded portion; a drum rotatable on said shaft; key-controlled actuators for transmitting drive from said drum to said type bars respectively; a spring coiled about said shaft within said drum and having its opposite ends connected to said drum and said shaft respectively; an electric motor connected to said shaft for rotating it to rewind said spring; a traveling nut on said shaft threaded portion; a pin fixed to said drum and extending slidably through said nut and parallel to said shaft to effect relative rotation of the nut and shaft and endwise travel of the nut in response to relative rotation of the shaft and drum; a switch in circuit with said electric motor; a switch-operating arm carried by said switch; fingers on said arm disposed on opposite sides of said nut longitudinally of said shaft and being respectively engageable by said nut when it travels endwise in opposite directions for turning said switch off and on; and means for adjusting said switch and with it said arm and fingers bodily longitudinally of the shaft and maintaining them in adjusted position.

37. In a typewriter or like machine, a plurality of type bars; a rotatable drum; power means tending to rotate said drum; a plurality of actuators connected respectively to said type bars and being adapted to be driven by said drum; escapement mechanism for restraining rotation of said drum; key-controlled means for effecting release of the drum by the escapement mechanism and driving of a selected actuator by said drum; and means for rotating said drum reversely to the direction of its actuator-operating movement for permitting the return to normal or inactive positions of two or more actuators and associated type bars which have become jammed due to simultaneous operation.

38. In a typewriter or like machine, a plurality of type bars; a rotatable drum; power means tending to rotate said drum; a plurality of actuators connected respectively to said type bars and being adapted to be driven by said drum; escapement mechanism for restraining rotation of said drum; key-controlled means for effecting release of the drum by the escapement mechanism and driving of a selected actuator by said drum; and a manually operable device normally operatively disengaged from said drum but being adapted to be moved manually into operative engagement therewith and moved further for rotating said drum reversely to the direction of its actuator-operating movement for permitting the return to normal or inactive positions of two or more actuators and associated type bars which have become jammed due to simultaneous operation.

39. In a typewriter or like machine, a plurality of type bars; a rotatable drum; power means tending to rotate said drum; a plurality of actuators connected respectively to said type bars and being adapted to be driven by said drum; escapement mechanism for restraining rotation of said drum; key-controlled means for effecting release of the drum by the escapement mechanism and driving of a selected actuator by said drum; a plurality of teeth spaced circumferentially on said drum; a manually operable device mounted to slide adjacent said drum and transversely thereto; a pawl movably mounted on said device and normally being disconnected from said drum teeth but being engageable with a tooth on said drum for rotating the drum reversely to the direction of its actuator-operating movement; and means for maintaining said pawl in driving engagement with the said tooth during operating movement of said device but being responsive to retraction of said device and engagement of said pawl with a second drum tooth adjacent the aforesaid tooth for releasing said pawl and permitting it to move away from said drum and over and beyond said second tooth.

40. In a typewriter or like machine, a plurality of type bars; a rotatable drum; power means tending to rotate said drum; a plurality of actuators connected respectively to said type bars and being adapted to be driven by said drum; escapement mechanism for restraining rotation of said drum; key-controlled means for effecting release of the drum by the escapement mechanism and driving of a selected actuator by said drum; a plurality of teeth spaced circumferentially on said drum; a manually operable device mounted to slide adjacent said drum and transversely thereto; a pawl also adjacent and extending transversely to said drum; a pin and slot connection between said pawl and said device mounting said pawl on said device for both pivotal and sliding movement; and holding means on said device engageable with said pawl when the pawl is at one limit of its sliding movement on said device to hold the pawl against pivotal movement away from said drum and to thereby hold the pawl in operative engagement with a tooth on said drum when said device is slid in one direction to rotate said drum reversely to its actuator-operating movement, said holding means being disengaged from said pawl to permit pivotal movement of the pawl away from the drum when the pawl is at the other limit of its sliding movement on said device, whereby said device may be slid in the opposite direction without corresponding movement of said drum.

41. In a typewriter or like machine, a plurality of type bars; a rotatable toothed drum; power means tending to rotate said drum; a plurality of actuators connected respectively to said type bars and being adapted to be driven by teeth on said drum; escapement mechanism including a toothed escapement wheel and a dog normally engageable with escapement wheel front tooth faces for restraining rotation of said drum but being movable transversely to the plane of said escapement wheel to release said escapement wheel and said drum, the rear faces of said escapement wheel teeth being formed as cam surfaces whereby said escapement wheel may be rotated reversely and said dog thereby cammed from behind a contacting escapement wheel tooth to enable the dog to be returned to a position in front of said escapement wheel tooth; key-controlled means for effecting release of the drum by the escapement mechanism and driving of a selected actuator by said drum; and means for rotating said drum reversely to the direction of its actuator-operating movement for permitting the return to normal or inactive positions of two or more actuators and associated type bars which have become jammed due to simultaneous operation.

42. In a typewriter or like machine, a frame; a plurality of type bars mounted thereon; a rotatable member; a constantly running motor; an impositive drive transmitting device connected between said motor and said rotatable member; a plurality of movably mounted actuators connected respectively to said type bars and being adapted to be brought into operative engagement with said rotatable member to be driven thereby; escapement mechanism normally restraining said rotatable member against rotation; a plurality of key levers connected to said escapement mechanism and connected respectively to said actuators for selectively conditioning said actuators for engagement with said rotatable member and for operating said escapement mechanism to release said rotatable member temporarily for driving the conditioned actuator and moving the associated type bar on a printing stroke; and means for shifting the axis of said rotatable member relative to the mounting of the actuators to thereby vary its arc of contact with the conditioned actuator and consequently vary the force of the type bar impact.

43. In a typewriter or like machine, a frame; a plurality of type bars mounted thereon; a rotatable member; a constantly running motor; an impositive drive transmitting device connected between said motor and said rotatable member; a plurality of movably mounted actuators connected respectively to said type bars and being adapted to be brought into operative engagement with said rotatable member to be driven thereby; escapement mechanism normally restraining said rotatable member against rotation; a plurality of key levers connected to said escapement mechanism and connected respectively to said actuators for selectively conditioning said actuators for engagement with said rotatable member and for operating said escapement mechanism to release said rotatable member temporarily for driving the conditioned actuator and moving the associated type bar on a printing stroke; a bail on which the rotatable member and the impositive drive device are mounted; means mounting the bail to rock for shifting the axis of said rotatable member relative to the mounting of the actuators to thereby vary the force of type bar impact; and manually operable means for rocking said bail and releasably maintaining it in adjusted position.

44. In a typewriter or like machine, a plurality of type bars; a rotatable toothed drum; power means for rotating said drum; escapement mechanism for restraining rotation of said drum; actuators connected respectively to said type bars; pawls movable respectively on said actuators; stop means on said actuators for limiting movement of said pawls in one direction on said actuators for transmitting drive from the pawls to their associated actuators for driving the associated type bars; means including returning means connected to said pawls and normally maintaining said pawls in the positions on said actuators limited by said stop means and maintaining said pawls and actuators together in positions wherein the pawls are disposed out of the path of a tooth on said drum; and key levers for operating said escapement mechanism and for respectively imparting to said actuators and thereby to said pawls initial movement sufficient to position a selected pawl in the path of said drum tooth to be engaged and driven by said drum tooth throughout a portion of a rotation thereof whereupon said drum tooth passes out of contact with said pawl, the construction and relative arrangement of said pawl, said actuator, said returning means, and said toothed drum being such that said returning means then moves said pawl on said actuator out of the drum tooth path and then returns said pawl and with it said actuator to their normal position while retaining said pawl out of the drum tooth path.

45. In a typewriter or like machine, a plurality of type bars; a rotatable toothed drum; power means for rotating said drum; escapement mechanism for restraining rotation of said drum; actuators connected respectively to said type bars; pawls movable respectively on said actuators; stop means for limiting movement of said pawls in one direction on said actuators for transmitting drive from the pawls to their associated actuators for driving the associated type bars; holding springs respectively maintaining said pawls releasably in the positions on said actuators limited by said stop means; returning springs connected to said pawls for normally maintaining said pawls and actuators in positions wherein the pawls are disposed out of the path of a tooth on said drum; and key levers for operating said escapement mechanism and for respectively imparting to said actuators and thereby to said pawls initial movement sufficient to position a selected pawl in the path of said drum tooth to be engaged and driven by said drum tooth throughout a portion of a rotation thereof whereupon said drum tooth passes out of contact with said pawl, the mounting and relative strengths of said holding and returning spring being such that during initial movement of an actuator effected by its associated key lever the associated holding spring will maintain the pawl against movement relative to the actuator until after the drum tooth has engaged the pawl to drive the latter and actuator and thereby additionally stress the returning spring sufficiently to enable it to move the pawl on the actuator against the urge of the holding spring and out of the drum tooth path.

46. In a typewriter or like machine, a plurality of type bars; a rotatable toothed drum; escapement mechanism for restraining rotation of said drum; pivoted actuators connected respectively to said type bars; pawls pivoted respectively on said actuators; stop means for fixing two limits of rocking of said pawls on their associated actuators; holding springs respectively interposed between said actuators and the associated pawls and being adapted to releasably maintain said pawls in one of their limit positions on said actuators wherein they will be engaged by a tooth on said drum when the actuators are given an initial rocking movement from their normal positions; returning springs having fixed anchorages and being connected to said pawls respectively for urging said pawls to their other limit positions on said actuators in which the pawls are out of the paths of the drum tooth irrespective of the positions of the actuators and for urging said actuators contra to the direction of their operating movement by said drum; an aligning member engageable by said pawls for limiting the return movement of said pawls and actuators; and key levers for operating said escapement mechanism and for respectively imparting to said actuators and thereby to said pawls initial movement sufficient to position a selected pawl in the path of said drum tooth.

47. In a typewriter or like machine, a frame; a plurality of type bars movably mounted thereon; a power-driven member; a plurality of movably mounted actuators connected respectively to said type bars and being adapted to be brought into operative engagement with said power-driven member to be operated thereby; escapement mechanism normally restraining said power-driven member against operation; a plurality of key levers; means for connecting said key levers to said escapement mechanism and thereby effecting operation of said escapement mechanism and said power-driven member upon depression of a key lever; and connections between said key levers and said actuators independent of the connections between said key levers and said escapement mechanism and being respectively operative upon depression of a key lever for moving the associated actuator and its associated type bar manually and by such movement of the actuator conditioning the latter to be operated by said power-driven member to complete the type bar movement.

48. In a typewriter or like machine, a frame; a plurality of type bars mounted thereon; a power driven rotatable drum formed with a plurality of longitudinally extending circumferentially spaced teeth; a plurality of actuators movably mounted on said frame and normally being beyond the path of the drum teeth; connections between said actuators and said type bars respectively; an escapement wheel rotatable with said drum; escapement dog means movably mounted on said frame and normally cooperating with said escapement wheel to restrain the drum against rotation; a plurality of key levers; connections between said key levers and said actuators respectively operative upon depression of a key lever for moving the associated actuator to position a part thereof in the path of a drum tooth and by such movement of the actuator impart to its associated type bar an initial manually effected movement; and means independent of the connections between said key levers and said actuators for connecting said key levers to said dog means and being operative upon depression of a key lever for moving said dog means to release said escapement wheel and bring about a partial rotation of said drum.

49. In a typewriter or like machine, a frame; a plurality of type bars movably mounted thereon; a power-driven member; a plurality of movably mounted actuators connected respectively to said type bars and being adapted to be brought into operative engagement with said power-driven member to be operated thereby; escapement mechanism normally restraining said power-driven member against operation; connections between the key levers and the escapement mechanism and actuators operative upon depression of a key lever for first starting the associated type bar on an operating movement by force applied manually on the key lever, and for then bringing the associated actuator into operative engagement with said power-driven member to be driven thereby to complete the operating movement of said type bar by power supplied by said power-driven member; and means for rendering inoperative the connections between the key levers and the escapement mechanism.

50. In a typewriter or like machine, a plurality of type bars; a rotatable toothed drum; escapement mechanism for restraining rotation of said drum; pivoted actuators connected respectively to said type bars; pawls pivoted respectively on said actuators; stop means for fixing two limits of rocking of said pawls on their associated actuators; holding springs respectively interposed between said actuators and the associated pawls and being adapted to releasably maintain said pawls in one of their limit positions on said actuators wherein they will be engaged by a tooth on said drum when the actuators are given an initial rocking movement from their normal positions; returning springs having fixed anchorages and being connected to said pawls respectively for urging said pawls to their other limit positions on said actuators in which the pawls are out of the paths of the drum tooth irrespective of the positions of the actuators and for urging said actuators contra to the direction of their operating movement by said drum; an aligning plate providing the fixed anchorage for said returning springs and being engageable by said pawls for engaging said pawls and moving them back to the first-named limit positions on said actuators and for limiting the return movement of said pawls and actuators; and key levers for operating said escapement mechanism and for respectively imparting to said actuators and thereby to said pawls initial movement sufficient to position a selected pawl in the path of said drum tooth.

WILLIAM OTTO MICHELSEN.